United States Patent [19]

Blok et al.

[11] Patent Number: 4,474,255

[45] Date of Patent: Oct. 2, 1984

[54] BEER KEG SCALE

[76] Inventors: Stephen A. Blok, P.O. Box 1172, Pembroke, Ontario; Frank A. Kapounek, 103 Glamorgan Dr., Kanata, Ontario, both of Canada

[21] Appl. No.: 484,950

[22] Filed: Apr. 14, 1983

[51] Int. Cl.³ .................... G01G 19/52; G01G 19/00; G01G 23/00
[52] U.S. Cl. .................................... 177/146; 177/50; 177/245
[58] Field of Search .............. 177/50, 132, 145, 245, 177/146, 147, 148, 149; 222/164, 166

[56] References Cited

U.S. PATENT DOCUMENTS

| 2,408,906 | 10/1946 | Bocchicchio | 177/145 X |
| 3,220,498 | 11/1965 | De Paro et al. | 177/245 X |
| 3,476,269 | 11/1969 | Baker et al. | 177/145 X |

Primary Examiner—Harry E. Moose, Jr.
Assistant Examiner—Patrick W. Foster
Attorney, Agent, or Firm—Burke-Robertson, Chadwick & Ritchie

[57] ABSTRACT

A weighing and supporting device for liquid container kegs, such as those for beer. The device comprises a flat, keg-receiving platform beneath which is located a weigh scale, the platform being pivotable between an inclined, dispensing position and a horizontal, weighing position. In the latter, the platform rests upon the scale and is free to move up and down on that scale to enable the platform and a keg supported thereon to be weighed. By taking periodic measurements of the weight of the keg supported on such a device, the need for a liquid metering device in the line of liquid flow from the keg is avoided.

10 Claims, 3 Drawing Figures

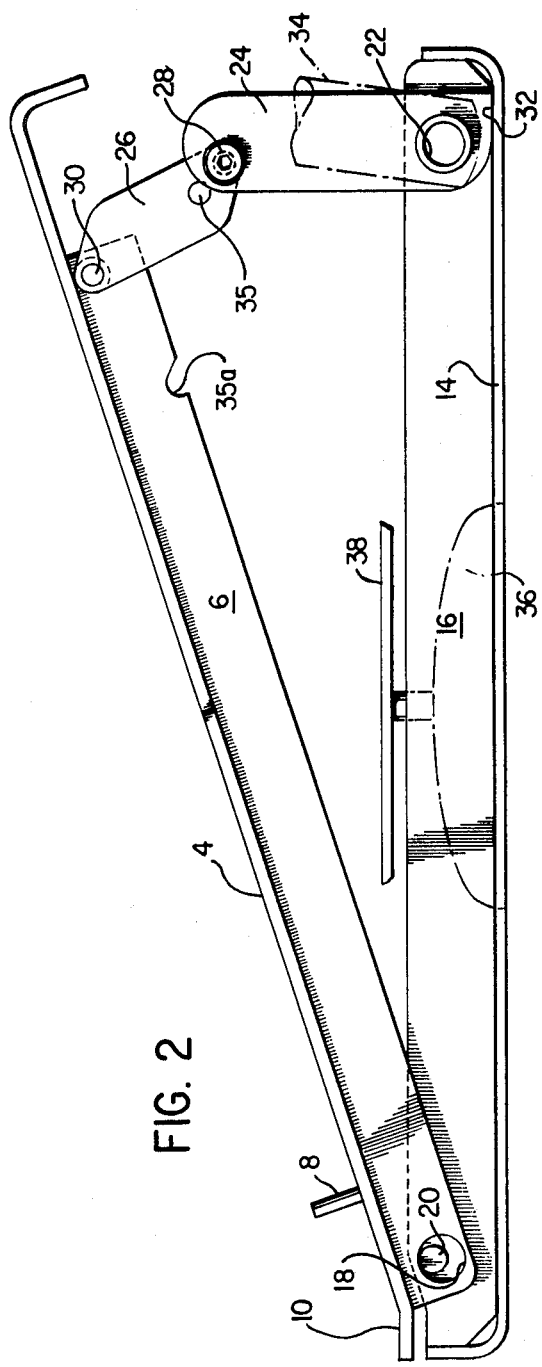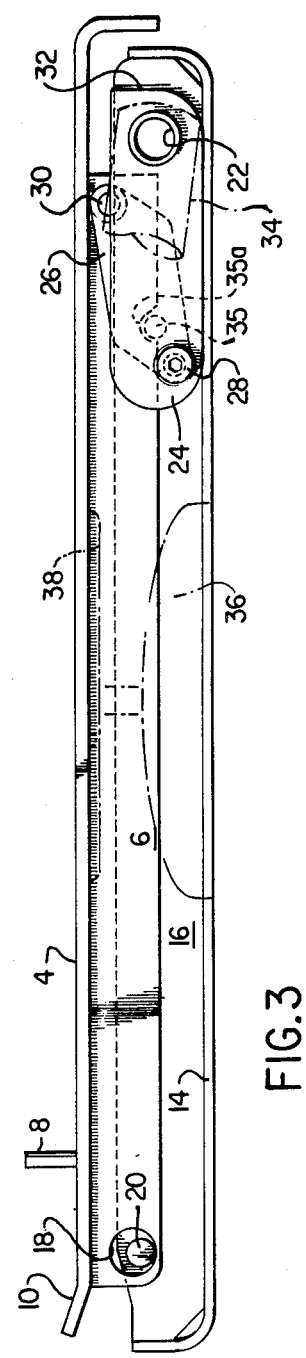
FIG. 2
FIG. 3

BEER KEG SCALE

BACKGROUND OF THE INVENTION

According to the present invention there is provided a weighing and supporting device for liquid container kegs, and more particularly a device which permits periodic measurements to be taken of the weight of the keg and its contents, while at the same time supporting the keg in a proper position for dispensing of its contents.

Beer for sale in nightclubs, restaurants, taverns and the like is often stored in and dispensed from metal kegs having flat, circular ends. Beer is stored under pressure and passed through appropriate tubing from such kegs to taps at a counter or bar. It is important for the owners of such places to ensure that a check is kept on the reported receipts from the sale of beer from such kegs as compared to the actual reduction in the contents of such kegs over a particular sales period, so that there is a check against pilfering or undercharging. Most establishments monitor the amount of beer drawn from the kegs by liquid metering devices, placed in the tubing feeding beer from the keg to the tap at the bar or counter. Such meters usually have vanes which are turned as beer flows from the keg to the tap, the rotating of the vanes turning a numerical dial associated with the meter. Such devices however are relatively expensive and have tended to be prone to breakdown or tampering. As well, as the keg nears the end of its contents, gas or foam may pass through the tubing and cause the meter to give erroneous readings.

These kegs are generally stored on one of their flat, circular ends, with the spout (connected to the tubing leading to the tap) for the keg being positioned near the bottom of the keg on its side. So that the maximum amount of beer can be obtained from such kegs, the kegs are often inclined towards the spout, for example by placing a board underneath the keg at the rear of the end on which it is resting. Generally an extra glass or two of beer may be obtained from the keg in this manner.

Of background interest is Canadian Patent No. 478,636 of Jelinas issued Nov. 20, 1951 which describes and illustrates a dispensing and measuring device for barrels in which the barrels are inclined, on their sides, towards a spigot or spout, and the contents leaving the barrel are weighed in a pail. When a particular, predetermined pail weight is reached, then the spigot is automatically shut off.

It is an object of the present invention to provide an alternative, economical method of monitoring the contents of beer, or indeed any other liquid, held in such a keg or container. It is a further object of the invention to provide a device which will additionally enable the keg to be normally inclined, during use, at an optimum angle for emptying of most of its contents.

SUMMARY OF THE INVENTION

According to the present invention there is provided a weighing and supporting device for liquid container kegs. The device comprises a flat base and a flat platform upon which the keg is to stand spaced from and superimposing the base. Pivot means are provided, securing one end of the platform to a corresponding end of the base so that the platform may be pivoted between weighing position parallel to the base and dispensing position in which the plane of the platform is at an angle to that of the base. A manually operable lever linkage extends between and is secured to the platform base to enable the pivoting of the platform between weighing and dispensing positions and the maintaining of the platform, as required, in either of these positions. The device further provides a scale means having a weighing surface. The scale means is positioned between the base and the platform so that a central portion of the platform rests on the weighing surface in weighing position and the platform is clear of the weighing surface when in dispensing position. The pivot means and the lever linkage are constructed so that, when the platform is in weighing position resting on the weighing surface, it is movable in upward and downward directions for weighing of the platform.

In a preferred form of the invention, the plane of the platform, when in dispensing position, is at angle of about 20° to the plane of the base.

The device according to the present invention, by providing a simple means of periodically weighing a keg and its contents, provides an effective means of monitoring the amount of liquid, such as beer, contained in such keg. It avoids many of the problems previously found with liquid metering devices. When not being used as a scale, the platform may be tilted to its optimum, dispensing angle to ensure maximum emptying of the contents of the keg. The device itself is small and readily fits into confined quarters, for example in a refrigerated cabinet in which the keg may be normally situated. An electronic scale may be used, providing a digital readout in a easy to read location. The device can be relatively inexpensively constructed.

BRIEF DESCRIPTION OF THE DRAWINGS

These and other objects and advantages of the invention will become apparent upon reading the following detailed description and upon referring to the drawings in which:

FIG. 2 is a side view of the device according to FIG. 1; and

FIG. 3 is a similar side view of the device of FIG. 1, the device being in weighing position.

Figure 1:
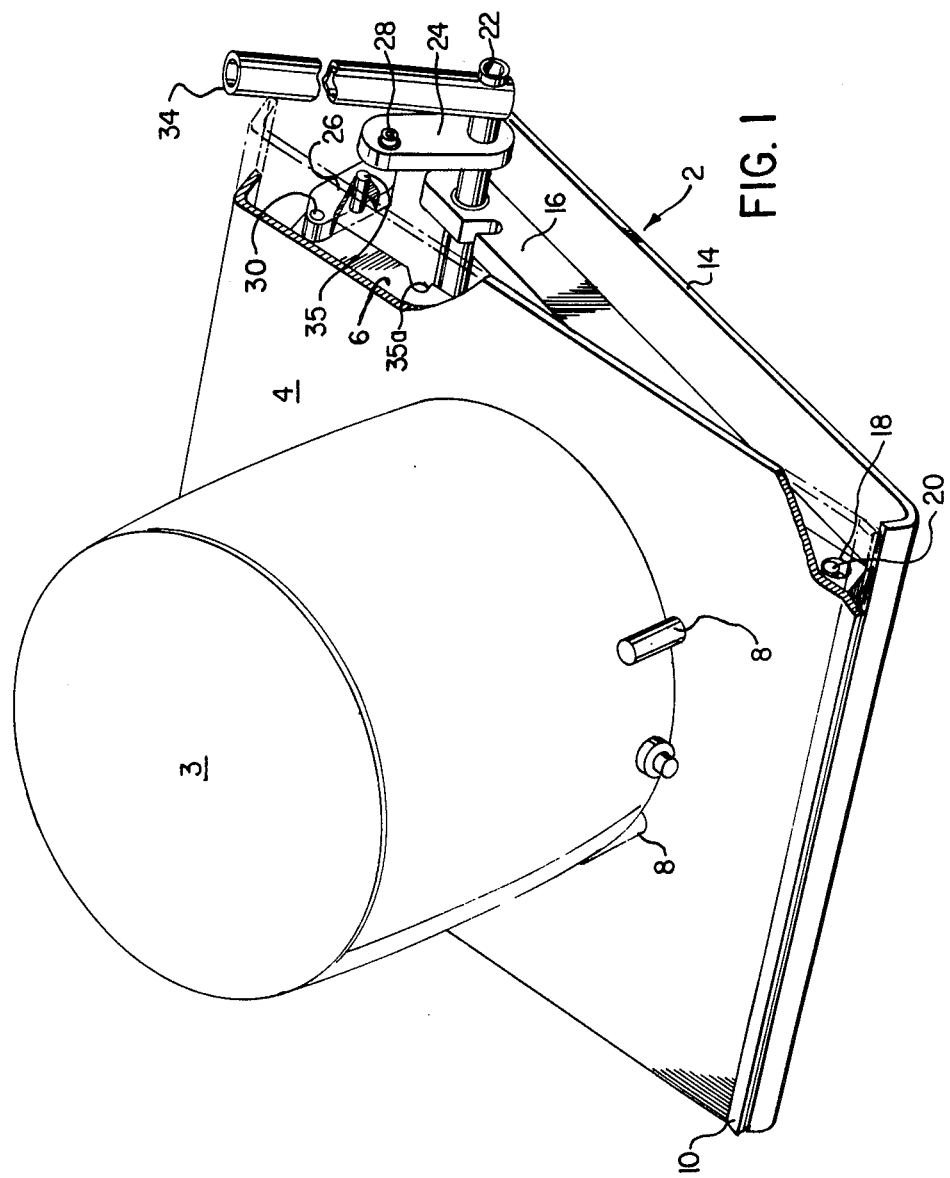
FIG. 1 is a perspective view of a measuring and supporting device for kegs according to the present invention, the device being in inclined, dispensing position.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Turning to FIG. 1, there is shown a perspective view of a weighing and supporting device 2 for a liquid containing keg 3 according to the present invention. The device comprises a planar platform 4, upon which the base of keg 3 sits. To the underneath surface of platform 4, near its edges, are secured brace bars 6 extending front to back. Lugs 8 secured to the upper side of platform 4 project upwardly and support keg 3 when platform 4 is in tilted position as illustrated in FIGS. 1 and 2. As well, when keg 3 is positioned as illustrated, abutting lugs 8, these lugs ensure that it is properly centered with respect to platform 4 for weighing. The front end 10 of platform 4 is bent slightly upwardly out of the plane of the platform and provides a lip to catch spillage or moisture and prevent it from falling into the device beneath platform 4.

Base 14 is positioned beneath platform 4. Base 14 is essentially flat. Extending front-to-back, and secured to base 14 near its sides to sit inside of and adjacent bars 6, are brace bars 16. Aligned holes 18 are provided in the forward part of each bar 6, and aligned pivot rods 20 are secured to each bar 16 and project through each hole 18, the holes having a diameter significantly greater than that of pivot rods 20 for reasons which will become apparent hereinafter.

At the rear end of bars 16, extending from side to side of device 2 is rod 22. It is pivotably secured to bars 16 to rotate about its longitudinal axis. At each side of device 2, one end of a first lever link 24 is secured to rod 22, to pivot with rod 22 and a second lever link 26 is pivotably secured at pivot 28 to the first link. These second links 26 are also pivotably secured to the rear end of bars 6. As can be seen in FIG. 2, the bottom, lefthand corner of link 24 is rounded, and its end 32 is flattened and positioned to rest upon base 14 when in the position illustrated. This provides a stop, to prevent rod 22 from being pivoted further in the clockwise direction, beyond the position illustrated in FIGS. 1 or 2. In the position illustrated, with pivot 28 lying beyond, in the clockwise direction, the line joining the axis of rod 22 and pivot 30, the forces exerted by the platform on links 24 and 26 will tend to keep the links in that position, supporting the platform in its inclined, dispensing positioned illustrated. This stop is important, since, because of the play allowed in the rotation of bars 6 about corresponding bars 16, resulting from the enlarged diameter of holes 18 in bars 6 circumscribing pivot rods 20, movement of pivot 28 in a clockwise direction too far to the right as rod 22 is pivoted in a clockwise direction may result in a sudden collapse of the platform and rod 6 as link 26 approaches a horizontal position.

It is desired that the keg, and hence platform 4, be maintained in dispensing position at about a 20° angle to base 14, assuming base 14 to be horizontal. While links 24 and 26 of any appropriate sizes may be used to achieve this tilted, dispensing position of the platform 4, they preferably are of a size to achieve the orientation illustrated in FIG. 2 when in dispensing position.

A handle 34 is also secured to rod 22 to enable that rod to be rotated and manoeuver links 24 and 26 and platform 4 between weighing and dispensing positions. When platform 4 is in horizontal position as illustrated in FIG. 3, and rod 22 is rotated clockwise by means of handle 34, link 24 is moved from its position as illustrated in FIG. 3, clockwise, towards its position as illustrated in FIG. 2.

It will be understood that, in moving from weighing position illustrated in FIG. 3, to dispensing position illustrated in FIG. 2, and vice versa, the movement of these links 24 and 26 is dictated by the fact that pivot 28 swings about the longitudinal axis of rod 22, and pivot 30 at the upper end of link 26 swings about an axis which is more or less the center of rod 20. When the platform is in weighing position as illustrated in FIG. 3, links 24 and 26, which have an exaggerated, opening scissors-like action about pivot 28 when moved, are in closed, generally horizontal position. In this position, the combination of enlarged holes 18 circumscribing rods 20, and the positioning of these links so that pivot 30 is free to move a limited amount upwardly and downwardly in a vertical direction, permits the platform to have relatively free vertical movement as it rests on scale platform 38 of scale 36 in this position, for accurate weighing of the platform. As rod 22 is initially pivoted clockwise from the position illustrated in FIG. 3, the left extremity of link 24 and pivot 28 move upwardly. An offset bearing surface 35 is provided, on the inside of link 26, to contact the underside of bar 6 in notch 35a, as the upward movement of pivot 28 starts the pivoting of link 26 about pivot 30. This action of bearing surface 35 on bar 6, as well as the offset positioning of pivots 28 and 30 to opposite sides of the main body portions of links 24 and 26, assist in the lifting of the back of platform 4, at this early stage. At this stage, the angle between links 24 and 26 is too acute to permit link 26 to apply much upward lifting force to its corresponding bar 6 and platform 4. As this angle increases however the movement of pivot 28 to the right commences to generate, through link 26, an upward movement or force on platform 4 through pivot 30, resulting in continued, steady upwardy pivoting of platform 4 about pivot 20.

This linkage system thereby provides a sturdy and steady, highly leveraged upward and downward pivoting action to the back of platform 4, such qualities being required because of the relatively large weight carried by platform 4 when keg 3 is positioned on it, and the delicate nature of scale 36 which is situated between platform 4 and base 14 and centered with respect to the former. Moreover, as handle 34 is rotated counterclockwise to move the platform from dispensing position to weighing position, and platform 4 approaches horizontal, weighing position, it will be understood that its rate of pivoting descent is slowed by offset bearing surface 35 of link 26 coming into contact with notch 35a of bar 6.

Scale platform 38 is positioned to receive a central portion of the underside of platform 4 when the platform is lowered to weighing position as illustrated in FIG. 3.

In this position, platform 4 will be able to move freely in an upward and downward direction, supported for purposes of weighing on scale platform 38. In this way a relatively accurate reading of the weight of platform 4 and keg 3 and its contents supported thereon can be obtained. In addition, in this position, the links resist lateral movement of the platform to further facilitate accurate weighing. Scale 36 may be provided with an electronic, digital readout to facilitate use of the device. As well, since it is not good for a scale to bear a continuous weighing load, when a reading of the weight of the keg 3 and its contents is not required, then the platform 4 is moved to tilted, dispensing position (FIG. 2) by appropriate manipulation of handle 34.

It should also be noted that the device according to the present invention may be constructed of extremely narrow in width, so that it is relatively easy to roll a heavy barrel or keg onto it, even in a small space.

Thus it is apparent that there has been provided in accordance with the invention a weighing and supporting device for liquid container kegs that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What we claim as our invention:

1. A weighing and supporting device for liquid container kegs comprising:
    (a) a flat base;
    (b) a flat platform upon which the keg is to stand spaced from and superimposing the base;
    (c) pivot means securing an end of the platform to a corresponding end of the base so that the platform may be pivoted between weighing position parallel to the base and dispensing position in which the plane of the platform is at an angle to that of the base;
    (d) a manually operable lever linkage extending between and secured to the platform base to enable the pivoting of the platform between weighing and dispensing positions and the maintaining of the platform, as required, in either of these positions; and
    (e) a scale means having a weighing surface, the scale means being positioned between the base and the platform so that a central portion of the platform rests on the weighing surface when in weighing position and the platform is entirely clear of the weighing surface when in dispensing position; the pivot means and the lever linkage being constructed so that, when the platform is in weighing position resting on the weighing surface, it is free to move in upward and downward directions for weighing of the platform.

2. A device according to claim 1 wherein the plane of the platform, when in dispensing position forms an angle of about 20° with the plane of the base.

3. A device according to claim 1 wherein a rod is rotatably secured to the base and the lever linkage comprises an elongated, first link with one end rigidly secured to the rod for rotation therewith, and an elongated second link with one end pivotably secured to the other end of the first link and with the other end pivotably secured to the platform.

4. A device according to claim 3 wherein an elongated handle is rigidly secured to the rod for manual operation of the lever linkage.

5. A device according to claim 1 wherein the underside of the platform and the upper surface of the base each include pairs of spaced brace bars secured thereto extending along their sides, those of the base positioned to sit inside of and adjacent those of the platform, and wherein the pivot means comprises rod means secured to one of the pairs of brace bars normal thereto, the rod means being circumscribed by enlarged aperture means in the other, adjacent pair of brace bars so that there is sufficient play between the rod means and the aperture means, when the platform is in weighing position, to permit upward and downward movement of the platform for purposes of weighing.

6. A device according to claim 5 wherein the lever linkage is such that, when the device is in weighing position, the longitudinal axes of the first and second links form a small angle and the first link lies beneath the plane of the platform so that, as the rod is rotated to move the platform to dispensing position, a bearing surface associated with each of the second links will bear against the corresponding brace bar of the platform to initially assist the lifting of that platform to dispensing position.

7. A device according to claim 3 wherein the second link is positioned, when the platform is in weighing position, such that its end secured to the platform swings generally in an up and down direction about the pivot at its other end.

8. A device according to claim 1, 3 or 7 wherein a stop means is associated with the lever linkage to releasably secure the lever linkage in a position to maintain the platform in dispensing position.

9. A device according to claim 1 wherein the platform is provided with keg locating and securing means to properly position the keg on the platform, when in weighing position, and maintain the keg in position on the platform when the platform is in dispensing position.

10. A device according to claim 9 wherein the keg centering and securing means comprises a pair of spaced upward projections secured to the surface of the platform.

* * * * *